United States Patent [19]

Gado

[11] 4,126,657

[45] Nov. 21, 1978

[54] METHOD FOR CURING TIRES AND THE LIKE

[75] Inventor: Victor C. Gado, Akron, Ohio

[73] Assignee: William R. Holland, Akron, Ohio ; a part interest

[21] Appl. No.: 652,199

[22] Filed: Jan. 26, 1976

[51] Int. Cl.² ............................................. B29H 5/02
[52] U.S. Cl. ..................................... 264/85; 264/37; 264/315
[58] Field of Search ...................... 264/37, 85, 88, 94, 264/315, 326; 425/29, 30, 42, 50

[56] References Cited

U.S. PATENT DOCUMENTS

| 1,544,023 | 6/1925 | Minor | 264/85 |
| 1,605,683 | 11/1926 | Meyer et al. | 264/315 |
| 3,579,626 | 5/1971 | Brittain | 264/315 X |

*Primary Examiner*—Jan H. Silbaugh
*Attorney, Agent, or Firm*—William R. Holland

[57] ABSTRACT

A method and apparatus for curing tires or similar vulcanized products in a press or autoclave equipped with separable molds with inserted bladders, tubes, bags, or bladderless center mechanisms. During the principal shaping and vulcanizing period of the tire curing cycle, the bladder is first filled with steam to conform the bladder and tire to the mold and begin the cure. The steam is then flushed and replaced with water at a high pressure and at a high temperature, or in some cases with high pressure steam and then such hot water, to continue pressure molding and curing of the tire. In the next phase of the curing cycle, inert gas at a high pressure is introduced to force the water from the bladder, without vaporization or significant loss of heat, back to storage facilities for subsequent reuse. In the final phase of the shaping and curing cycle, the inert gas is evacuated from the bladder, and collected for reuse, by means of a vacuum tank or vacuum pump, if no cooling of the product is desired, or by the introduction of high pressure cold water for the final cooling and shaping period of the cycle, whereupon the water is flushed and extracted from the bladder and the tire is removed from the mold. By employing this process and the associated apparatus and system, the hot curing water is not mixed with the cold water, with resultant loss of temperature, thereby yielding substantial energy savings without omitting or foreshortening the cold water cooling and shaping step necessary to insure tire quality and prevent deformation.

5 Claims, 1 Drawing Figure

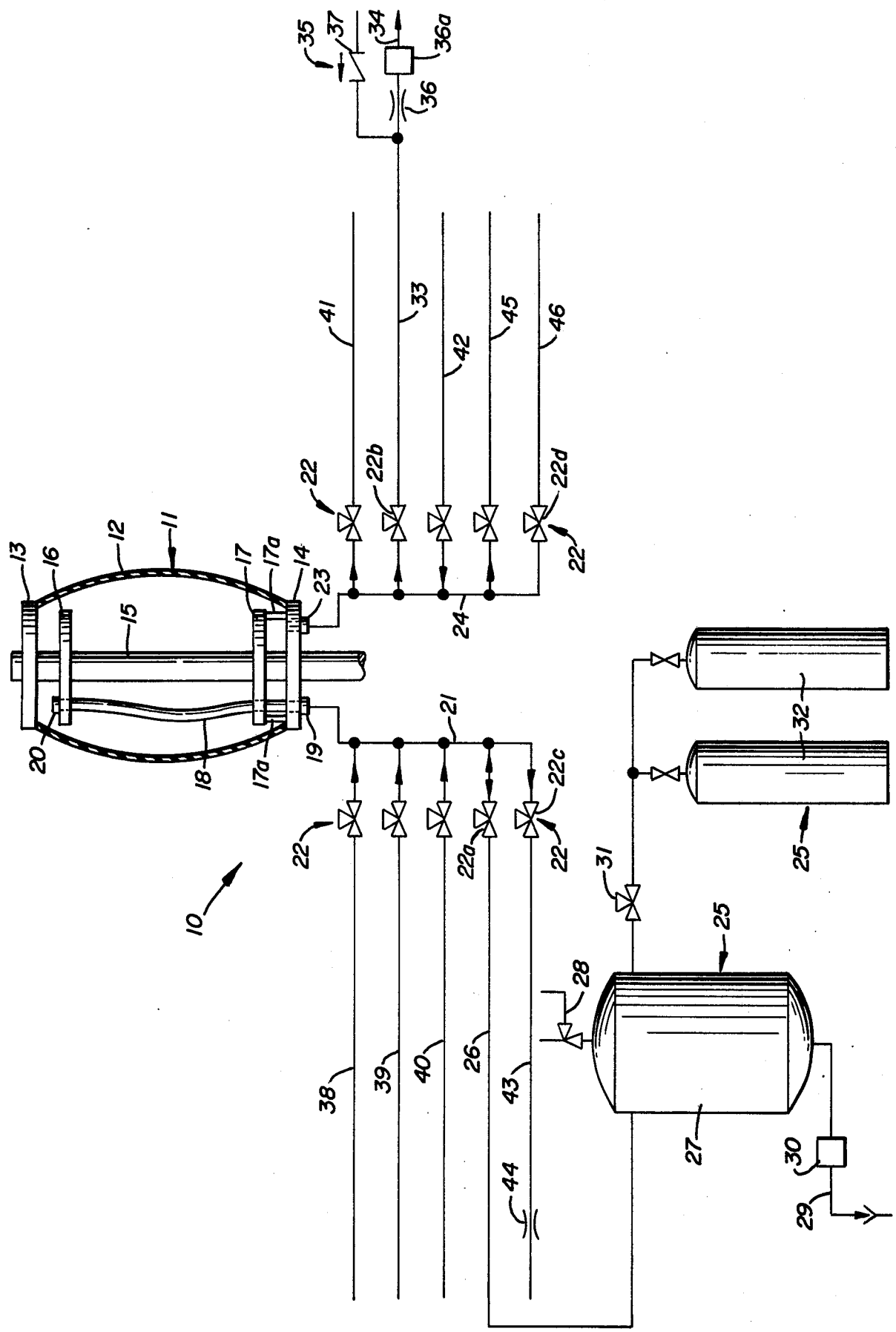

METHOD FOR CURING TIRES AND THE LIKE

The foregoing abstract is furnished merely to facilitate literature searching and to afford a general and cursory summary of the invention, and is not to be interpreted as limiting the scope and spirit of the invention. For an understanding of the full nature and extent of the present inventive improvement, reference must be made to the following detailed description in conjunction with the accompanying drawing and appended claims.

BACKGROUND OF THE INVENTION

The present invention relates generally to the curing of vehicle tires and similar vulcanized products.

More particularly, the invention relates to the shaping and curing of such tires and products in presses or molds having insertable bladders, tubes, bags, or bladderless center mechanisms into which high temperature water is introduced for shaping, curing, and molding, after which cold water is introduced for final cooling and shaping.

More specifically, this invention relates to a method, and associated apparatus and systems, to achieve substantial conservation of energy in such curing processes.

In the manufacture of vehicle tires and similar vulcanized products (e.g., air springs, curing bladders, etc.) the modern practice in the art of shaping and curing the same has been to insert a bladder, tube or air bag into an uncured band or barrel-shaped tire or product; to supply pressure to the interior of the inserted member while closing separable mold pieces around the assemblage to form the tire or product into its desired toroidal or other finished shape; and, thereafter, to supply heat to the mold parts by a platen or autoclave or pot heater, while supplying vulcanizing heat and shaping and molding pressure to the interior of the inserted bladder member for the prescribed time. In recent years, the widespread practice in the industry and art has been to use automatic tire shaping and curing presses such as the type known by the trademark "Bag-O-Matic" manufactured by the McNeil Corp. of Akron, Ohio, and the type known by the trademark "Autoform" manufactured by NRM Corp. of Akron, Ohio. These types of automatic presses, which are well-known in the art and industry, generally employ separable mold halves with center shaping and curing mechanisms utilizing bladders into which shaping, heating, and cooling gases, fluids or media are introduced for the shaping, molding and curing of the tires.

Recently, the principal shaping and curing fluid or medium utilized in the process has been high pressure and high temperature hot water. The conventional technique for employing this hot water curing process generally comprises the steps of: (1) closing the mold and starting shaping; (2) flushing the shaping fluid; (3) circulating high pressure hot water; (4) flushing the hot water with high pressure cold water and thereafter circulating it for cooling and shaping; and (5) draining the internal water and creating an internal vacuum as the molds open for extraction of the tire.

It will be readily appreciated by those skilled in the art that there is a substantial energy loss between steps three and four by virtue of the mixing of the hot water with cold, especially as such processes and systems are usually closed and are dependent upon the most efficient reuse of the shaping and curing fluids.

For a more detailed description of this state of the art of hot water curing, reference may be made to an article entitled "Successful Use of HTHW For Tire Curing Relies On Water Treatment, Recovery" in the journal "Heating, Piping & Air Conditioning" of March, 1963, at pages 110 through 116.

THE PRIOR ART

More recently, it has been proposed in U.S. Pat. No. 3,579,626 that the high pressure hot water in such processes be purged with steam in an attempt to alleviate this energy loss problem. This proposal contemplates the subsequent venting of this purging steam to the atmosphere and the removal of the tire from the mold without the introduction of cooling water, for the avowed purpose of maintaining the molds and bladder at a high temperature to minimize reheating for subsequent curing cycles.

However, the proposal has not been adopted in the industry and art owing to the fact that the mixing of purging steam and high pressure cold water, when cooling of the product is desired prior to removal from the molds, inevitably causes steam condensation, thereby creating a partial vacuum causing the bladder to deform resulting in corresponding deformity in the shape of the tire. Furthermore, the procedure of venting the purging steam to atmosphere, in and of itself, wastes energy. Moreover, particularly due to the predominate use of synthetic fibers in the reinforcing plies of tires and similar vulcanized products, the proposed elimination of the final cooling and shaping stage is not feasible; for, if cooling takes place entirely outside the molds with no shaping pressure, the tires or products are subject to serious deleterious deformation, with resultant detrimental effect upon their performance characteristics, and, often, even their usefulness.

SUMMARY OF THE INVENTION

It has been discovered that the high pressure hot water used in the main shaping and curing phase of the curing cycle may be purged from the bladder internal shaping member by introducing high pressure inert gas. The high pressure hot water is then recovered without a substantial change in its thermodynamic state; and the inert gas is likewise recovered, whereupon the usual and desirable cold water shaping and cooling step is employed.

Utilizing this improved method conserves substantial energy while preserving tire or product uniformity and quality.

Elucidating a preferred version of this improved method, together with providing preferred embodiments of improved systems and apparatus to perform the process, accordingly become the principal objects of this invention, with other objects of the invention becoming more apparent upon reading of the following brief specification considered and interpreted in view of the accompanying drawing.

The drawing generally represents and depicts a schematic and one-line diagram of a preferred embodiment of system and apparatus adaptable for use with an automatic tire curing press of the "Bag-O-Matic" type, as aforesaid.

DESCRIPTION OF THE PREFERRED EMBODIMENT

Referring to the drawing, the preferred embodiment of the improved system, generally designated by the numeral 10 employs a conventional automatic tire press center shaping and curing mechanism or member, generally designated by the numeral 11. The mechanism or member 11 comprises a generally cylindrical or barrel-shaped rubber bladder 12 closed by circular upper end plate 13 and lower circular end plate 14, which is affixed to the press (not shown). The End plate 13 is affixed to a vertically reciprocable center shaft 15, usually mounted on a piston at its base (not shown) for selectively pulling the upper end plate 13 downward to form the bladder 12 into a generally toroidal shape after an uncured or "green" tire carcass or band (not shown) has been placed over the center mechanism or member 11 between separable platen-heated mold halves (not shown), all in a conventional and known manner.

Within the conventional center mechanism or member 11, certain improved apparatus is provided including upper and lower dispersion discs or stilling collars, 16 and 17, respectively, collar 16 being affixed to the center shaft 15, and collar 17 being affixed to end plate 14 be spacers 17a and having a center bore to permit reciprocal movement of shaft 15, and a flexible hose or conduit 18 connected at its lower end to lower end plate 14 at an inlet port 19, and connected at its upper end to upper end plate 16 through a discharge or outlet port 20, the dispersion discs or stilling collars 16 and 17 and the flexible hose or conduit 18 cooperate to insure uniform dispersion and distribution of the hot water, inert purging gas, and cooling water, as hereinafter described.

While a flexible hose or conduit 18 is preferred, it will be appreciated by those skilled in the art that a telescoping pipe or conduit, or a conduit bore in shaft 15, with outlet ports at or above collar 16, could also be used.

Inlet port 19 is connected to a supply manifold 21, which is connected through an array of conventional selectively-actuated control valves, designated generally by the numeral 22, to the various supply and return lines for the shaping, curing and cooling gases, fluids or media, as hereinafter described.

Similarly, a conventional outlet port 23 in lower end plate 14 is connected to a return manifold 24, which, in turn, is connected to an array of valves 22 to various return pipes or lines, as hereinafter described.

Referring particularly to the selectively-actuated pressure control valve 22a, it connects the supply manifold 21 to the inert gas purging subsystem, designated generally by the numeral 25, through a pipe or line 26 leading to a surge tank 27, which is equipped with a safety or pressure relief valve 28 and connected to a cooling water supply hot well or a sewer 29 (for drainage of water from the inert gas) through a gas trap 30. The surge tank 27 is supplied with inert gas through pressure reducing valve 31 from compressed gas containers or cylinders 32, which, alternatively, may be inert gas generators.

Inert gas, preferably carbon dioxide or nitrogen, is preferred, because compressed air would cause deleterious blooming or ozone damage to the interior of the rubber bladder 12, shortening bladder life and insulating the tire from uniform curing heat.

Referring to the selectively-actuated pressure control valve 22b connected to return manifold 24, it is connected by a hot water return line or pipe 33 to the storage return line 34 of a contact heater or storage tank (not shown, the latter being preferred) through a unique reverse-fill valve assembly 35 comprising a parallel connection of an orifice 36, which may be adjustable, a gas trap 36a and the check valve 37.

As the pressure in line 34 is typically substantially less than that in line 33, the reverse-fill valve assembly 35 dispenses with the need for expensive conventional differential pressure control valve stations, and is particularly useful in conjunction with the inert gas purging subsystem 25 for alternate filling and flushing of the center mechanism member 11 from and to the contact heater or storage tank return line 34. The gas trap 36a insures the retention of the inert gas in the member 11. As the member 11 is filled from the hot water storage tank, the tank level will be lowered thereby reducing the pressure in the tank. The selective timer for control valve 22b is set for the maximum time to empty member 11 of hot water while the storage tank is under maximum pressure. As the time for forcing the hot water from the member 11 with inert gas is decreased, due to a reduction in pressure in line 34, the inert gas trap 36a will stop any loss of inert gas to the return line 34, even though control valve 22b may be open.

Referring now generally to the drawing, the sequence of the steps of the improved method of curing will be described using certain pressures, as examples, it being understood by those skilled in the art that pressures and temperatures vary according to tire or product specifications and plant locales.

First, as the center mechanism or member 11 is being drawn down into a generally toroidal shape inside the tire and the mold halves are being closed, relatively low pressure shaping steam is admitted from line 38 through supply manifold 21 to the interior of the bladder 12.

Next, when the mold is closed, a high pressure steam flush at 180 p.s.i. is likewise admitted from line 39 and is flushed out of the bladder 12 to a high pressure steam flush out blowdown line 41, followed by the admission of high pressure steam, then hot water at 300 p.s.i. from supply line 40 for the main shaping and curing phase of the cycle.

When this main hot water shaping and curing phase is completed inert gas at 250 p.s.i. is admitted through valve 22a to supply manifold 21 to purge the hot water from bladder 12 to the return manifold 24 and through valve 22b to the hot water return line 33 where the pressure is regulated to 225 p.s.i. by the valve assembly 35. The purged hot water then passes to the contact heater or storage tank return line 34, at a pressure of 180 p.s.i.

Next, after the inert gas has purged the bladder 12 of high pressure hot water, cooling water at 275 p.s.i. is admitted from line 42 to the return manifold 24 and thence the bladder 12, as the inert gas is purged back out through supply manifold 21 and valve 22a to line 26 for recovery in the inert gas purging subsystem 25. After the inert gas has been purged from the bladder 12, the control valve 22a closes; and control valve 22c opens allowing the cooling water to circulate through the bladder 12 and return to the cooling water hot well. As the cooling water is being circulated, the bladder 12 is kept at 225 p.s.i. by orifice 44. After the cooling water has circulated for a specified time, main drain valve 22d opens to discharge the cooling water through line 46 to the cooling water hot well.

Finally, the bladder 12 is evacuated through return manifold 24 by a vacuum line 45, as the mold has opened and the center mechanism or member 11 is elevated or elongated for removal of the tire from the press.

Wile a full and complete description of the invention has been set forth in accordance with the dictates of the Patent Statutes, it is to be understood that the invention is not intended to be limited to the specific embodiment herein shown and described.

Accordingly, modifications of the invention may be resorted to without departing from the spirit hereof or the scope of the appended claims.

What is claimed is:

1. A method for curing tires and the like on a center mechanism adapted for positioned within separable molds comprising the steps of positioning said tire or the like and said center mechanism within said molds, introducing an initial shaping fluid into said mechanism, purging said fluid, introducing into said mechanism high temperature hot water of a temperature in the range of 325° to 375° F. and of a pressure in the range of 225 to 600 p.s.i. and maintaining said hot water in said mechanism for a predetermined time sufficient to achieve the desired curing of the tire or the like, according to the tire or the like being cured, purging said hot water with inert gas, and then introducing cold water into said mechanism to cool said tire or the like preparatory to the removal thereof from said molds, the application of pressure of said initial shaping fluid, hot water, inert gas and cold water pressure mediums being maintained during each of said steps resulting in conformance of said tire or the like to said molds, whereby mixing of said hot water and said cold water and resultant loss of temperature in said hot water is substantially avoided without omitting or significantly foreshortening said cold water cooling step necessary to insure quality of said tire or the like and to prevent deformation thereof.

2. A method, according to claim 1, wherein said inert gas is principally carbon dioxide.

3. A method, according to claim 1, wherein said inert gas is principally nitrogen.

4. A method, according to claim 1, wherein substantially all of said inert gas is recovered for reuse.

5. A method, according to claim 1, wherein substantially all of said hot water is recovered for reuse without substantial loss of heat.

* * * * *